United States Patent [19]
Brookhart et al.

[11] Patent Number: 6,150,482
[45] Date of Patent: Nov. 21, 2000

[54] POLYMERIZATION OF PROPYLENE

[75] Inventors: Maurice S. Brookhart, Chapel Hill; Brooke L. Small, Carrboro, both of N.C.

[73] Assignees: E. I. du Pont de Nemours and Company, Wilmington, Del.; University of North Carolina, Chapel Hill, N.C.

[21] Appl. No.: 09/006,031

[22] Filed: Jan. 12, 1998

Related U.S. Application Data

[60] Provisional application No. 60/034,933, Jan. 13, 1997.
[51] Int. Cl.$^7$ ........................................................ C08F 4/52
[52] U.S. Cl. ...................... 526/161; 526/169.1; 526/171; 526/172; 526/130; 526/901; 526/351
[58] Field of Search ................................ 526/161, 169.1, 526/171, 172

[56] References Cited

U.S. PATENT DOCUMENTS 5,955,555  9/1999  Bennett .................................... 526/133

FOREIGN PATENT DOCUMENTS 02078663  3/1990  Japan ........................... C07D 213/53
WO 96/37523  11/1996  WIPO .............................. C08F 10/00

OTHER PUBLICATIONS

Paul E. Figgins, et al., Complexes of Iron(II), Cobalt(II) and Nickel(II) with Biacetyl–bis–methylimine, 2–Pyridinal–m–ethylimine and 2.6–Pyridindial–bis–methylimine, *J. Am. Chem. Soc.*, 82, 820–824, Feb. 20, 1960.

Francis Lions, et al., Tridentate Chelate Compounds. I, *J. Chem. Soc.* A, 79, 2733–2738, Jun. 5, 1957.

Reinhard Nesper, et al., Palladium(II) complexes of chiral tridentate nitrogen pybox ligands, *Journal of Organo Metallic Chemistry*, 507, 85–101, 1996.

*Primary Examiner*—David W. Wu
*Assistant Examiner*—R. Rabago
*Attorney, Agent, or Firm*—Craig H. Evans; Bart E. Lerman; Joel D. Citron

[57] ABSTRACT

Propylene may be polymerized by contacting it with certain iron complexes of selected 2,6-pyridinecarboxaldehydebis (imines) and 2,6-diacylpyridinebis(imines). The polymers produced are useful as molding resins.

32 Claims, No Drawings

POLYMERIZATION OF PROPYLENE

This application claims the benefit of U.S. Provisional Application Ser. No. 60/034,933, filed Jan. 13, 1997.

FIELD OF THE INVENTION

Selected iron complexes of 2,6-pyridinecarboxaldehydebis(imines) and 2,6-diacylpyridinebis(imines) are catalysts for the polymerization of propylene.

FIELD OF THE INVENTION

Polymers of propylene are important items of commerce, millions of tons being produced annually. These polymers are used in a myriad of ways, for instance being used for fibers, films, molding resins, etc. In most cases, propylene is polymerized using a catalyst, often a transition metal compound or complex. These catalysts vary in cost per unit weight of polypropylene produced, the structure of the polymer produced, the possible need to remove the catalyst from the polypropylene, the toxicity of the catalyst, etc. Due to the commercial importance of polypropylenes, new polymerization catalysts are constantly being sought.

P. E. Figgins, et al., J. Am. Chem. Soc., vol. 82, p. 820–824, and/or F. Lions, et al., J. Am. Chem. Soc., vol. 79, p. 2733–2738 report the synthesis of certain 2,6-diacetylpyridinebis(imines) and certain iron complexes of these tridentate ligands. Japanese Patent Application 02-078,663 reports the compound

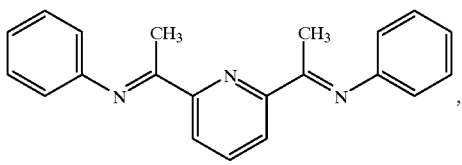

and an iron[II] complex of this latter compound in which two molecules of the 2,6-diacetylpyridinebis(imine) are present in the complex. None of these references reports that these compounds polymerize propylene.

SUMMARY OF THE INVENTION

This invention concerns a first process for the polymerization of propylene, comprising, contacting, at a temperature of about −40° C. to about +300° C., a compound of the formula

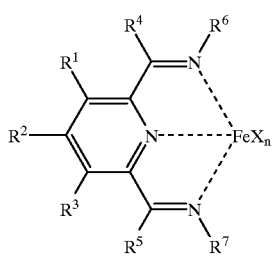

(II)

with propylene and:

(a) a first compound W, which is a neutral Lewis acid capable of abstracting $X^-$, an alkyl group or a hydride group from M to form $WX^-$, $(WR^{20})^-$ or $WH^-$ and which is also capable of transferring an alkyl group or a hydride to M, provided that $WX^-$ is a weakly coordinating anion; or (b) a combination of second compound which is capable of transferring an alkyl or hydride group to M and a third compound which is a neutral Lewis acid which is capable of abstracting $X^-$, a hydride or an alkyl group from M to form a weakly coordinating anion;

wherein:

each X is an anion;

n is 1, 2 or 3 so that the total number of negative charges on said anion or anions is equal to the oxidation state of a Fe atom present in (II);

$R^1$, $R^2$ and $R^3$ are each independently hydrogen, hydrocarbyl, substituted hydrocarbyl, or an inert functional group;

$R^4$ and $R^5$ are each independently hydrogen, hydrocarbyl, an inert functional group or substituted hydrocarbyl;

$R^6$ and $R^7$ are aryl or substituted aryl; and $R^{20}$ is alkyl.

This invention also concerns a second process for the polymerization of propylene, comprising contacting, at a temperature of about −40° C. to about +300° C., a Fe[II] or Fe[III] complex of a tridentate ligand of the formula

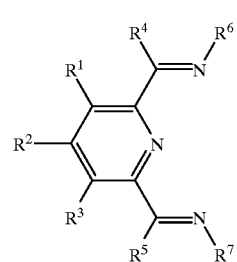

(I)

with propylene, wherein:

$R^1$, $R^2$ and $R^3$ are each independently hydrogen, hydrocarbyl, substituted hydrocarbyl, or an inert functional group;

$R^4$ and $R^5$ are each independently hydrogen, hydrocarbyl, an inert functional group or substituted hydrocarbyl; and $R^6$ and $R^7$ are aryl or substituted aryl;

and provided that an Fe[II] or Fe[III] atom also has bonded to it an empty coordination site or a ligand that may be displaced by said propylene, and a ligand that may add to said propylene.

This invention also concerns a third process for the polymerization of propylene, comprising, contacting, at a temperature of about −40° C. to about +300° C., propylene and a compound of the formula

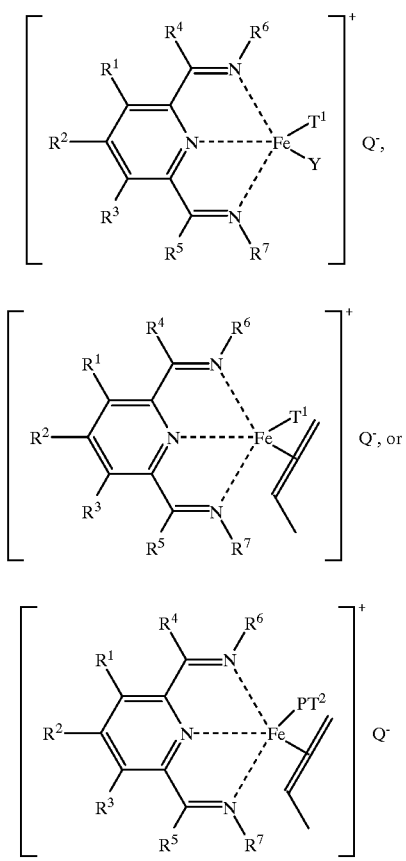

(VII)

(XII)

(IX)

wherein:

$R^1$, $R^2$ and $R^3$ are each independently hydrogen, hydrocarbyl, substituted hydrocarbyl, or an inert functional group;

$R^4$ and $R^5$ are each independently hydrogen, hydrocarbyl, an inert functional group or substituted hydrocarbyl; and $R^6$ and $R^7$ are aryl or substituted aryl;

$T^1$ is hydride or alkyl or any other anionic ligand into which propylene can insert;

Y is a vacant coordination site or a neutral ligand capable of being displaced by propylene;

Q is a relatively non-coordinating anion;

P is a divalent polymeric group; and $T^2$ is an end group.

DETAILS OF THE INVENTION

Herein, certain terms are used. Some of them are:

A "hydrocarbyl group" is a univalent group containing only carbon and hydrogen. If not otherwise stated, it is preferred that hydrocarbyl groups herein contain 1 to about 30 carbon atoms.

By "substituted hydrocarbyl" herein is meant a hydrocarbyl group which contains one or more substituent groups which are inert under the process conditions to which the compound containing these groups is subjected. The substituent groups also do not substantially interfere with the process. If not otherwise stated, it is preferred that substituted hydrocarbyl groups herein contain 1 to about 30 carbon atoms. Included in the meaning of "substituted" are heteroaromatic rings.

By "(inert) functional group" herein is meant a group other than hydrocarbyl or substituted hydrocarbyl which is inert under the process conditions to which the compound containing the group is subjected. The functional groups also do not substantially interfere with any process described herein that the compound in which they are present may take part in. Examples of functional groups include halo (fluoro, chloro, bromo and iodo), ether such as —$OR^{18}$ wherein $R^{18}$ is hydrocarbyl or substituted hydrocarbyl. In cases in which the functional group may be near an iron atom, such as $R^4$, $R^5$, $R^8$, $R^{12}$, $R^{13}$, and $R^{17}$ the functional group should not coordinate to the metal atom more strongly than the groups in compounds containing $R^4$, $R^5$, $R^8$, $R^{12}$, $R^{13}$, and $R^{17}$ (see below for definitions of these groups) which are shown as coordinating to the metal atom, that is they should not displace the desired coordinating group.

By an "alkyl aluminum compound" is meant a compound in which at least one alkyl group is bound to an aluminum atom. Other groups such as alkoxide, hydride, and halogen may also be bound to aluminum atoms in the compound.

By "neutral Lewis base" is meant a compound, which is not an ion, which can act as a Lewis base. Examples of such compounds include ethers, amines, sulfides, and organic nitrites.

By "cationic Lewis acid" is meant a cation which can act as a Lewis acid. Examples of such cations are sodium and silver cations.

By relatively noncoordinating (or weakly coordinating) anions are meant those anions as are generally referred to in the art in this manner, and the coordinating ability of such anions is known and has been discussed in the literature, see for instance W. Beck., et al., Chem. Rev., vol. 88 p. 1405–1421 (1988), and S. H. Strauss, Chem. Rev., vol. 93, p. 927–942 (1993), both of which are hereby included by reference. Among such anions are those formed from the aluminum compounds in the immediately preceding paragraph and $X^-$, including $R^{19}_3AlX^-$, $R^{19}_2AlClX^-$, $R^{19}AlCl_2X^-$, and "$R^{19}AlOX^-$", wherein $R^{19}$ is alkyl containing 1 to 25 carbon atoms. Other useful noncoordinating anions include $BAF^-$ {BAF=tetrakis[3,5-bis(trifluoromethyl)phenyl]borate}, $SbF_6^-$, $PF_6^-$, and $BF_4^-$, trifluoromethanesulfonate, p-toluenesulfonate, $(R_fSO_2)_2N^-$, and $(C_6F_5)_4B^-$.

By an empty coordination site is meant a potential coordination site that does not have a ligand bound to it. Thus if a propylene molecule is in the proximity of the empty coordination site, the propylene molecule may coordinate to the iron atom.

By a ligand that may add to propylene is meant a ligand coordinated to an iron atom into which a propylene molecule (or a coordinated propylene molecule) may insert to start or continue a polymerization. For instance, this may take the form of the reaction (wherein L is a ligand):

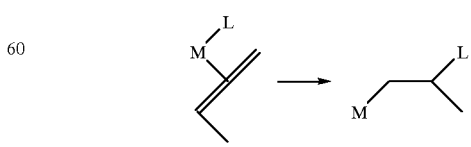

Note the similarity of the structure on the left-hand side of this equation to compound (IX) (see below).

Compounds useful as ligands herein in iron complexes are diimines of 2,6-pyridinedicarboxaldehyde or 2,6-diacylpyridines of the general formula

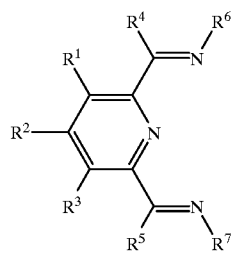
(IV)

wherein $R^1$, $R^2$ and $R^3$ are each independently hydrogen, hydrocarbyl, substituted hydrocarbyl, or an inert functional group, $R^4$ and $R^5$ are each independently hydrogen, hydrocarbyl, an inert functional group or substituted hydrocarbyl, and $R^6$ and $R^7$ are aryl or substituted aryl.

(IV) may be made by the reaction of a compound of the formula

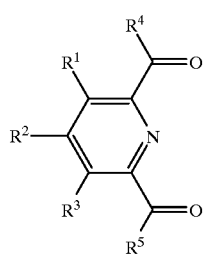
(VI)

with a compound of the formula $H_2NR^6$ or $H_2NR^7$, wherein $R^1$, $R^2$ and $R^3$ are each independently hydrogen, hydrocarbyl, substituted hydrocarbyl, or an inert functional group, $R^4$ and $R^5$ are each independently hydrogen, hydrocarbyl or substituted hydrocarbyl, $R^4$ and $R^5$ are each hydrocarbyl or substituted hydrocarbyl, and $R^6$ and $R^7$ are aryl or substituted aryl. These reactions are often catalyzed by carboxylic acids, such as formic acid. Reactions such as these are described in Experiments 1–4.

In (III), and hence in (I), (II), (IV), (VII), (IX) and (XII) that match the formula of (III), it is preferred that:

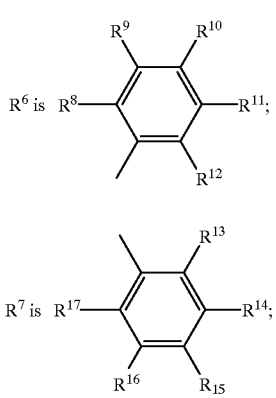
(X)

(XI)

$R^8$ and $R^{13}$ are each independently hydrocarbyl, substituted hydrocarbyl or an inert functional group;

$R^9$, $R^{10}$, $R^{11}$, $R^{14}$, $R^{15}$ and $R^{16}$ are each independently hydrogen, hydrocarbyl, substituted hydrocarbyl or an inert functional group;

$R^{12}$ and $R^{17}$ are each independently hydrogen, hydrocarbyl, substituted hydrocarbyl or an inert functional group;

and provided that any two of $R^8$, $R^9$, $R^{10}$, $R^{11}$, $R^{12}$, $R^{13}$, $R^{14}$, $R^{15}$, $R^{16}$ and $R^{17}$ that are vicinal to one another, taken together may form a ring.

Preferred compounds of formula (IV) and compounds in which (IV) is a ligand are those of compound (III) [note that (III) is a subset of (IV)], whether present in compounds such as (I), (II), (IV), (VI), (IX) and (XII). In (III), and hence in (I), (II), (IV), (VI), (IX) and (XII) that match the formula of (III), it is referred that:

$R^1$, $R^2$ and $R^3$ are hydrogen; and/or $R^9$, $R^{10}$, $R^{11}$, $R^{14}$, $R^{15}$ and $R^{16}$ is each independently halogen, alkyl containing 1 to 6 carbon atoms, or hydrogen, and it is more preferred that each of these is hydrogen; and/or $R^8$ and $R^{13}$ is each independently hydrogen, halogen, or alkyl containing 1 to 6 carbon atoms, and it is especially preferred that each $R^8$ and $R^{13}$ is alkyl containing 1–6 carbon atoms, and it is more preferred that $R^8$ and $R^{13}$ are methyl, i-propyl or t-butyl (but both $R^8$ and $R^{12}$ or both $R^{13}$ and $R^{17}$ can't be t-butyl in the same compound);

$R^{12}$ and $R^{17}$ is each independently halogen, hydrogen, or alkyl containing 1 to 6 carbon atoms, and it is it especially preferred that each $R^{12}$ and $R^{17}$ is alkyl containing 1–6 carbon atoms, and it is more preferred that $R^{12}$ and $R^{17}$ are methyl or i-propyl;

$R^4$ and $R^5$ are each independently halogen, hydrogen or alkyl containing 1 to 6 carbon atoms, and it is especially preferred that $R^4$ and $R^5$ are each independently hydrogen or methyl.

Specific preferred compounds (III) [and also in (I), (II), (IV), (VI), (IX) and (XII)] are:

$R^1$, $R^2$ and $R^3$, $R^9$, $R^{10}$, $R^{11}$, $R^{14}$, $R^{15}$ and $R^{16}$ are hydrogen, $R^4$ and $R^5$ are methyl, and $R^8$, $R^{12}$, $R^{13}$ and $R^{17}$ are isopropyl;

$R^1$, $R^2$ and $R^3$, $R^9$, $R^{10}$, $R^{11}$, $R^{14}$, $R^{15}$ and $R^{16}$ are hydrogen, $R^4$ and $R^5$ are methyl, and $R^8$, $R^{12}$, $R^{13}$ and $R^{17}$ are methyl;

$R^1$, $R^2$ and $R^3$, $R^9$, $R^{10}$, $R^{11}$, $R^{12}$, $R^{14}$, $R^{15}$, $R^{16}$ and $R^{17}$ are hydrogen, $R^4$ and $R^5$ are methyl, and $R^8$, and $R^{13}$ are t-butyl; or $R^1$, $R^2$ and $R^3$, $R^9$, $R^{10}$, $R^{11}$, $R^{14}$, $R^{15}$, $R^{16}$, $R^8$, $R^{12}$, $R^{13}$ and $R^{17}$ are hydrogen, and $R^4$ and $R^5$ are methyl.

In the polymerization processes described herein, it can be seen from the results that it is preferred that there be at least some steric crowding caused by the tridentate ligand about the Fe atom. Therefore, it is preferred that groups close to the metal atom be relatively large. It is relatively simple to control steric crowding if (III) is the tridentate ligand, since control of steric crowding can be achieved simply by controlling the size of $R^8$, $R^{12}$, $R^{13}$ and $R^{16}$. These groups may also be part of fused ring systems, such as 9-anthracenyl.

In the first polymerization process it is preferred that X is chloride, bromide or nitrate.

In the first polymerization process described herein an iron complex (II) is contacted with propylene and a neutral Lewis acid W capable of abstracting $X^-$, hydride or alkyl from (II) to form a weakly coordinating anion, and must alkylate or be capable of adding a hydride ion to the metal atom, or an additional alkylating agent or an agent capable of adding a hydride anion to the metal atom must be present. The neutral Lewis acid is originally uncharged (i.e., not ionic). Suitable neutral Lewis acids include $SbF_5$, $Ar_3B$ (wherein Ar is aryl), and $BF_3$. Suitable cationic Lewis acids or Bronsted acids include NaBAF, silver trifluoromethanesulfonate, $HBF_4$, or $[C_6H_5NH(CH_3)_2]^+[B(C_6F_5)_4]^-$. In those instances in which (II) (and similar catalysts which require the presence of a neutral Lewis acid or a cationic Lewis or Bronsted acid), does not contain an alkyl or hydride group already bonded to the metal atom, the neutral Lewis acid or a cationic Lewis or Bronsted acid also alkylates or adds a hydride to the metal or a separate alkylating or hydriding agent is present, i.e., causes an alkyl group or hydride to become bonded to the metal atom.

It is preferred that $R^{20}$ contains 1 to 4 carbon atoms, and more preferred that $R^{20}$ is methyl or ethyl.

For instance, alkyl aluminum compounds (see next paragraph) may alkylate (II). However, not all alkyl aluminum compounds may be strong enough Lewis acids to abstract $X^-$ or an alkyl group from the metal atom. In that case a separate Lewis acid strong enough to do the abstraction must be present. For instance, polymethyaluminoxane may be used as the "sole" Lewis acid, it both alkylates and does the abstraction from the metal atom. Triethylaluminum, however, alkylates the metal atom, but may not be a strong enough Lewis acid to abstract an anion from the metal atom, so another (stronger) Lewis acid, $B(C_6F_5)_3$, may also added to the polymerization. Without the stronger Lewis acid, $B(C_6F_5)_3$, present, the polymerization may not proceed.

A preferred neutral Lewis acid, which can alkylate the metal, is a selected alkyl aluminum compound, such as $R^{19}{}_3Al$, $R^{19}AlCl_2$, $R^{19}{}_2AlCl$, and "$R^{19}AlO$" (alkylaluminoxanes), wherein $R^{19}$ is alkyl containing 1 to 25 carbon atoms, preferably 1 to 4 carbon atoms. Suitable alkyl aluminum compounds include methylaluminoxane (which is an oligomer with the general formula $[MeAlO]_n$), $(C_2H_5)_2AlCl$, $C_2H_5AlCl_2$, and $[(CH_3)_2CHCH_2]_3Al$.

Metal hydrides such as $NaBH_4$ may be used to bond hydride groups to the metal M.

In the second polymerization process described herein an iron complex of (I) is either added to the polymerization process or formed in situ in the process. In fact, more than one such complex may be formed during the course of the process, for instance formation of an initial complex and then reaction of that complex to form a living ended polymer containing such a complex.

Examples of such complexes which may be formed initially in situ include

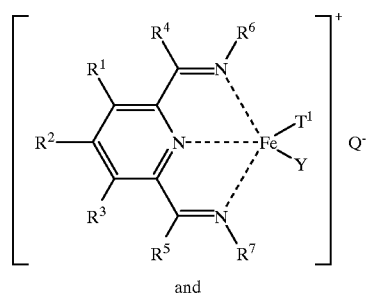
(VII)

and

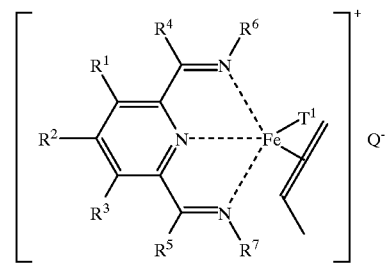
(XII)

wherein $R^1$ through $R^7$ are as defined above, $T^1$ is hydride or alkyl or any other anionic ligand into which propylene can insert, Y is a neutral ligand capable of being displaced by propylene or a vacant coordination site, the structure

represents a propylene molecule coordinated to the Fe, and Q is a relatively non-coordinating anion. Complexes may be added directly to the process or formed in situ. For instance, (VII) may be formed by the reaction of (II) with a neutral Lewis acid such as an alkyl aluminum compound. Another method of forming such a complex in situ is adding a suitable iron compound such as iron chloride compound, (I) and an alkyl aluminum compound. Other iron salts in which anions similar to chloride are present, and which may be removed by reaction with the Lewis or Bronsted acid may be employed. For instance metal halides, nitrates and carboxylates (such as acetates) may be used, particularly if they are slightly soluble in the process medium. It is preferred that these precursor metal salts be at least somewhat soluble in the process medium.

After the propylene polymerization has started, the complex may be in a form such as

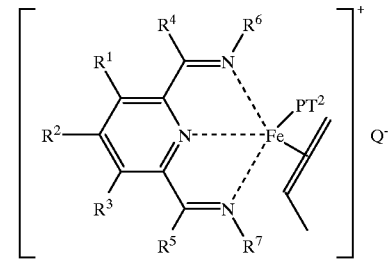
(IX)

wherein $R^1$ through $R^7$, and Q are as defined above, and P is a divalent polypropylene group, and $T^2$ is an end group, for example the groups listed for $T^1$ above. $T^2$ may be any group such as $T^1$ which is capable of being coordinated to the iron atom, and also capable of "adding" to a propylene molecule. It is preferred that the Fe atom be in +2 oxidation state in (VII), (VIII) and (IX). Compounds such as (VII), (IX) and (XII) may or may not be stable away from an environment similar to that of the polymerization process.

(VII), (IX) and (XII) may also be used, in the absence of any "co-catalysts" or "activators" to polymerize propylene in a third polymerization process. Except for the ingredients in the process, the process conditions for the third process, such as temperature pressure, polymerization medium, etc., may be the same as for the first and second polymerization processes, and preferred conditions for those processes are also preferred for the third polymerization process.

In all the polymerization processes herein, the temperature at which the propylene polymerization is carried out is about −40° C. to about +300° C., preferably about −25° C. to about 150° C., more preferably about 0° C. to about 100° C. The propylene pressure at which the polymerization is carried out is not critical, atmospheric pressure to about 275 MPa, preferably about atmospheric pressure and 5 MPa, being a suitable range.

The polymerization processes herein may be run in the presence of various liquids, particularly aprotic organic liquids. The catalyst system, propylene, and polypropylene may be soluble or insoluble in these liquids, but obviously these liquids should not prevent the polymerization from occurring. Suitable liquids include alkanes, cycloalkanes, selected halogenated hydrocarbons, and aromatic hydrocarbons. Specific useful solvents include hexane, toluene and benzene.

The propylene polymerizations herein may also initially be carried out in the solid state [assuming (II), (III) (IV) or (VII) is a solid] by, for instance, supporting (II), (III) (IV) or (VII) on a substrate such as silica or alumina, activating it with the Lewis (such as W, for instance an alkylalumipum compound) or Bronsted acid and exposing it to propylene. The support may also be able to take the place of the Lewis or Bronsted acid, for instance an acidic clay such as montmorillonite. Another method of making a supported catalyst is to start a polymerization or at least make an iron complex of another olefin or oligomer of an olefin such as cyclopentene on a support such as silica or alumina. These "heterogeneous" catalysts may be used to catalyze polymerization in the gas phase or the liquid phase. By gas phase is meant that the propylene is transported to contact with the catalyst particle while the propylene is in the gas phase.

In all of the polymerization processes described herein oligomers and polymers of propylene are made. They may range in molecular weight from oligomeric olefins, to lower molecular weight polypropylene waxes and liquids, to higher molecular weight polypropylene.

In the Examples and Experiments, the following abbreviations and terms are used:

MeOH—methanol

Mn—number average molecular weight

Mw—weight average molecular weight

MMAO—polymethylaluminoxane purchased from Akzo, Inc. as a 7 weight percent solution in toluene.

In the Experiments and Examples the following compounds are made and/or used. Compounds (XXI) and (XXII) were made by methods similar to those for (XVII)–(XX)

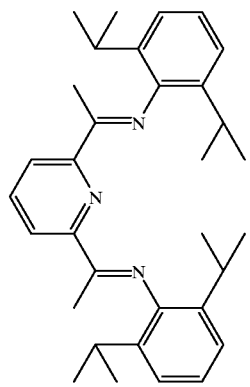

(XIII)

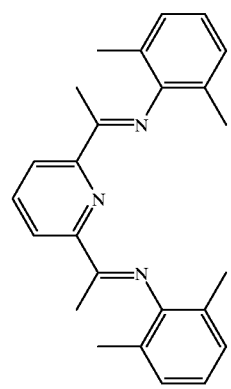

(XIV)

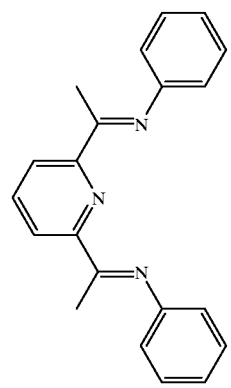

(XV)

(XVI)
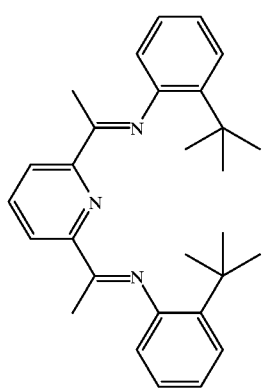

(XVII)
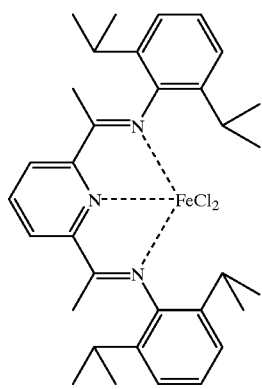

(XVIII)
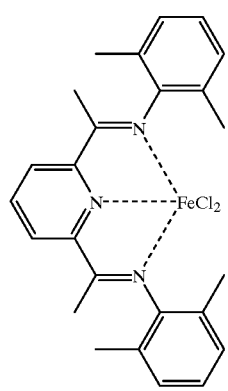

(XIX)
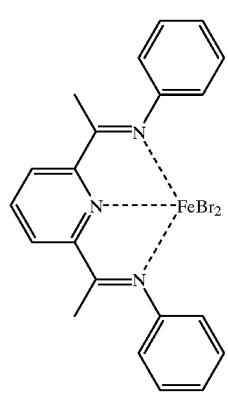

(XX)
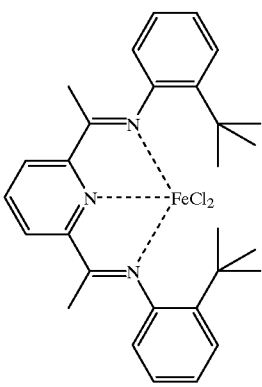

(XXI)
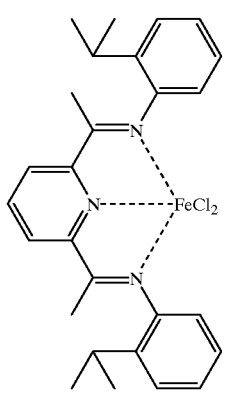

(XXII)
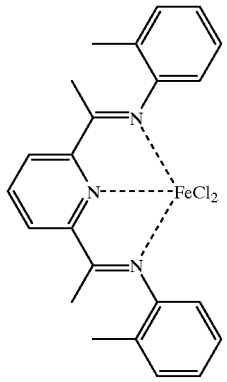

EXPERIMENT 1

2,6-Diacetylpyridine (250 mg) was weighed into a 50 ml Schlenk flask, 50 ml of MeOH was added and stirring was started with a magnetic stirring bar. Then 2.5 ml (5 eq.) of 2,6-diisopropylaniline was added via syringe followed by 3 drops of formic acid. The mixture was allowed to stir for 3 days, after which time 260 mg of a light yellow solid was collected by filtration and washed with MeOH. Successive crops of solid were collected giving a total yield of 520 mg (70.5%) of (XIII). $^1$H NMR (CDCl$_3$): 1.15 (d, 24H), 2.25(s, 6H), 2.80 (septet, 4H), 7.15(m, 6H), 7.90(t, 4H), 8.45 (d, 2H).

EXPERIMENT 2

2,6-Diacetylpyridine (1.0 g) was weighed into a 100 ml flask, 50 ml of MeOH was added and stirring was started with a magnetic stirring bar. Then 8.0 ml (10.58 eq.) of 2,6-dimethylaniline was added followed by 5 drops of formic acid. The mixture was allowed to stir overnight. Since no solid had formed, the reaction was heated overnight (second night) at 50° C. The flask was cooled in a wet ice bath and a yellow solid formed and was collected by filtration and washed with cold MeOH. A second crop of solid was collected giving a total yield of 1.29 g (57.1%) of (XIV). $^1$H NMR (CDCl$_3$): 2.05(s, 12H), 2.25(s, 6H), 6.95(t, 2H), 7.05(d, 4H), 7.90(t, 4H), 8.50(d, 2H).

EXPERIMENT 3

2,6-Diacetylpyridine (1.0 g) was weighed into a 100 ml flask, 50 ml of MeOH was added and stirring was started with a magnetic stirring bar. Then 8.0 ml (14.4 eq.) of aniline was added followed by 5 drops of formic acid. The mixture was allowed to stir overnight, and a yellow solid formed and was collected by filtration and washed with MeOH. Yield 1.58 g (82.3%) of 95% pure (XV). $^1$H NMR (CDCl$_3$): 2.40(s, 6H), 6.85(d, 4H), 7.12(t, 2H), 7.38(t, 4H), 7.87 (t, 4H), 8.35(d, 2H).

EXPERIMENT 4

2,6-Diacetylpyridine (1.0 g) was weighed into a flask, 10 ml of MeOH was added and stirring was started with a magnetic stirring bar. Then 2.5 ml (2.6 eq.) of 2-t-butylaniline was added followed by 5 drops of formic acid. A yellow solid formed within one h, but was indicated to be impure by NMR. Second and third crops were collected under more dilute conditions, yielding a total of 660 mg (25.3%) of pure (XVI). $^1$H NMR (CDCl$_3$): 1.35(s, 18H), 2.40(s, 6H), 6.55(dd, 2H), 7.07(td, 2H), 7.17(td, 2H), 7.42 (dd, 2H), 7.93(t, 4H), 8.43(d, 2H pyridyl).

EXPERIMENT 5

(XIII) (250 mg, 1.09 eq.) and 95 mg of FeCl$_2$ 4H$_2$O was weighed into a 10 ml Schlenk flask containing a stirbar. The flask was placed on a Schlenk manifold, backfilled 3 times with argon, and 10 ml of THF were added while stirring. After 2 h, the THF was removed under vacuum. The resulting deep blue solid, (XVII), was washed twice with ether and dried under vacuum.

EXPERIMENT 6

(XIV) (200 mg, 1.1 eq.) and 98 mg of FeCl$_2$ 4H$_2$O was weighed out into a 10 ml Schlenk flask containing a stirbar. The flask was placed on a Schlenk manifold, backfilled 3 times with argon, and 10 ml of THF were added while stirring. After 2 h, the THF was removed under vacuum. The resulting purple solid, (XVIII), was washed twice with ether and dried under vacuum. Elemental analysis: Calc. C, 60.51%; H, 5.48%; N, 8.47%. Found: C, 60.85%; H, 5.95%; N, 6.34%.

EXPERIMENT 7

(XV) (200 mg, 1.1 eq.) and 144 mg of FeBr$_2$ H$_2$O (13.1% H$_2$O by weight) was weighed out into a 10 ml Schlenk flask containing a stirbar. The flask was placed on a Schlenk manifold, backfilled 2 times with argon, and 10 ml of THF were added while stirring. After 1 h, the THF was removed under vacuum. The resulting dark purple solid, (XIX), was washed twice with ether and dried under vacuum.

EXPERIMENT 8

(XVI) (200 mg, 1.1 eq.) and 84.3 mg of FeCl$_2$ 4H$_2$O was weighed out into a 10 ml Schlenk flask containing a stirbar. The flask was placed on a Schlenk manifold, backfilled 3 times with argon, and 10 ml of THF were added while stirring. After 1.5 h, the THF was removed under vacuum. The resulting blue solid, (XX), was washed twice with pentane and dried under vacuum.

EXAMPLES 1–15

General Procedure: A 200–300 ml Schlenk flask was fitted with a stopcock and a stirbar, and a septum was used to seal the flask. The flask was then attached to a Schlenk manifold which allowed the flask to be put under vacuum or filled with a gas. The flask was flame dried under vacuum. Propylene was added as a gas and the pressure kept constant at atmospheric pressure. The metal complex was then weighed out to the nearest 0.1 mg, the septum removed and the complex quickly added under a positive gas pressure, and the septum replaced. The flask was then successively evacuated and filled with gas at least 2 times, then was charged by syringe with an organic liquid. The stirring was started and an alkyl aluminum compound (in solution) was added via syringe. If the monomer was not gaseous, the flask was removed from the Schlenk manifold and the polymerization conducted under static Ar pressure. After a given period of time the polymerization was quenched, typically with 6M HCl, and the polymer was precipitated with acetone or methanol. The polymer was filtered off and dried overnight in a vacuum oven. If the acetone or methanol failed to precipitate any polymer, the solvents mixture were allowed to evaporate to isolate any soluble polymers or oligomers.

Table 1 shows the exact conditions for each Example and the results obtained. The "TOF" is the number of moles of propylene polymerized per mole of iron compound used per hour. The M(olecular) W(eight) data is based on Gel Permeation Chromatography results using a toluene solvent and a polystyrene standard. Unless otherwise stated in the "NMR" column, $^1$H NMR were run on all products, and the results indicated that polypropylenes were obtained.

TABLE 1

| Ex. No. | Iron Complex, mg | ml MMAO | T (° C.) | Rxn Time (h) | Isolated Yield (g) | TOF (× 10$^3$/hr) | MW data | NMR |
|---|---|---|---|---|---|---|---|---|
| 1 | (XVII) 6.0 | 2.0 | 0 | 2.5 | 1.15 | 1.1 | M$_n$ = 7642, M$_w$ = 10659 | |
| 2 | (XVIII) 4.8 | 2.0 | 25 | 5.5 | — | — | | $^{13}$C: regioregular, ~40% mmmm; $^1$H |
| 3 | (XVII) 5.6 | 2.0 | 25 | 5.5 | — | — | | |
| 4 | (XVII) 4.8 | 2.0 | 0 | 3.0 | 1.2 | 1.2 | | |
| 5 | (XVIII) 4.8 | 2.0 | 0 | 8.0 | 5.1 | 1.6 | | $^{13}$C: regioregular, ~40% mmmm; $^1$H: end groups detectable |
| 6 | (XX) | 2.0 | 0 | 1.5 | 0.2 | 0.3 | | $^{13}$C: slight weighting toward mmmm; $^1$H: end groups detectable |

TABLE 1-continued

| Ex. No. | Iron Complex, mg | ml MMAO | T (° C.) | Rxn Time (h) | Isolated Yield (g) | TOF (× 10³/hr) | MW data | NMR |
|---|---|---|---|---|---|---|---|---|
| 7 | (XVIII) 4.8 | 1.2 | −5 | 22.0 | 13.0 | 1.5 | $M_n$ = 5318, $M_w$ = 9071 | $^{13}$C: regioregular, pentane-soluble fraction ~40% mmmm |
| 8 | (XVIII) 9.2 | 1.2 | 0 | 2.0 | 2.39 (2.08 pentane soluble) | 1.5 | | $^{13}$C (pent sol): ~35% mmmm; $^{1}$H: end groups detectable, mostly α-olefin |
| 9 | (XVIII) 9.3 | 1.2 | −20 | 2.0 | 1.78 (1.43 pentane soluble) | 1.1 | | $^{13}$C (pent sol): ~35% mmmm; $^{13}$C (pent ins): ~75% mmmm; $^{1}$H (pent sol): end groups detectable, mostly α-olefin |
| 10 | (XVIII) 9.7 | 1.2 | −40 | 2.0 | 1.39 (0.88 pentane soluble) | 0.8 | | $^{13}$C (pent sol): ~35% mmmm; $^{13}$C (pent ins): ~75% mmmm; $^{1}$H (pent sol): end groups detectable, mostly α-olefin |
| 11 | (XXI) 9.9 | 1.2 | −40 | 2.0 | 0.3 | — | ~C 35 by NMR end group anal. | |
| 12 | (XXII) 9.1 | 1.2 | 0 | 2.0 | 3.3 | 2.0 | ~C 35 by NMR end group anal. | $^{13}$C: messy; $^{1}$H: ~50% internal olefin, small vinylidene peak |
| 13 | (XXII) 9.1 | 1.2 | −20 | 2.0 | 1.4 | 0.9 | ~C 35 by NMR end group anal. | $^{13}$C: messy; $^{1}$H: ~50% internal olefin, ~15% vinylidene |
| 14 | (XXII) 10.5 | 1.2 | −40 | 2.0 | 0.9 | 0.5 | ~C 35 by NMR end group anal. | $^{1}$H: ~50% internal olefin, ~25% vinylidene |
| 15 | (XVII) | 1.0 | −20 | 1.5 | 7.4 | 9.6 | $M_n$ = 8651, $M_w$ = 14391 | $^{13}$C: regioregular, ~70% mmmm |

EXPERIMENT 9

Using the general procedure of Examples 1–15, 4.4 mg of (XIX), 10 ml of 1-hexene was polymerized at 25° C. in 50 ml of toluene, using 1.5 ml of MMAO in toluene as the alkyl aluminum compound. After 24 h the polymerization was quenched, and 1.54 g of an apparently dimeric species was isolated.

What is claimed is:

1. A process for the polymerization of propylene, comprising, contacting, at a temperature of about −40° C. to about +300° C., a compound of the formula

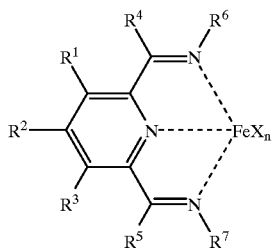

(II)

with propylene and:
(a) a first compound W, which is a neutral Lewis acid capable of abstracting $X^-$, an alkyl group or a hydride group from Fe to form $WX^-$, $WR^°$ or WH and which is also capable of transferring an alkyl group or a hydride to Fe, provided that $WX^-$ is a weakly coordinating anion; or
(b) a combination of a second compound which is capable of transferring an alkyl or hydride group to Fe and a third compound which is a neutral Lewis acid which is capable of abstracting $X^-$, a hydride or an alkyl group from Fe to form a weakly coordinating anion;
wherein:
each X is an anion;
n is 1, 2 or 3 so that the total number of negative charges on said anion or anions is equal to the oxidation state of a Fe atom present in (II);

$R^1$, $R^2$ and $R^3$ are each independently hydrogen, hydrocarbyl, substituted hydrocarbyl, or an inert functional group;
$R^4$ and $R^5$ are each independently hydrogen, hydrocarbyl, an inert functional group, or substituted hydrocarbyl;
$R^6$ and $R^7$ are aryl or substituted aryl; and
$R^{20}$ is alkyl.

2. A process for the polymerization of propylene, comprising contacting, at a temperature of about −40° C. to about +300° C., a Fe[II] or Fe[III] complex of a tridentate ligand of the formula

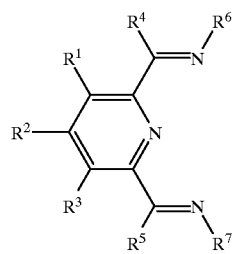

(I)

with propylene, wherein:

$R^1$, $R^2$ and $R^3$ are each independently hydrogen, hydrocarbyl, substituted hydrocarbyl, or an inert functional group;
$R^4$ and $R^5$ are each independently hydrogen, hydrocarbyl, an inert functional group or substituted hydrocarbyl; and
$R^6$ and $R^7$ are aryl or substituted aryl;
and provided that a Fe[II] or Fe[III] atom also has bonded to it an empty coordination site or a ligand that may be displaced by said propylene and a ligand that may add to said propylene.

3. The process as recited in claim 1 or 2 wherein:

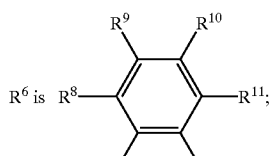

(X)

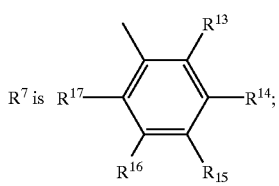

(XI)

$R^8$ and $R^{13}$ are each independently hydrocarbyl, substituted hydrocarbyl or an inert functional group;

$R^9$, $R^{10}$, $R^{11}$, $R^{14}$, $R^{15}$ and $R^{16}$ are each independently hydrogen, hydrocarbyl, substituted hydrocarbyl or an inert functional group;

$R^{12}$ and $R^{17}$ are each independently hydrogen, hydrocarbyl, substituted hydrocarbyl or an inert functional group;

and provided that any two of $R^8$, $R^9$, $R^{10}$, $R^{11}$, $R^{12}$, $R^{13}$, $R^{14}$, $R^{15}$, $R^{16}$ and $R^{17}$ that are vicinal to one another, taken together may form a ring.

4. The process as recited in claim 3 wherein:

$R^1$, $R^2$ and $R^3$ are hydrogen;

$R^9$, $R^{10}$, $R^{11}$, $R^{14}$, $R^{15}$ and $R^{16}$ is each independently halogen, alkyl containing 1 to 6 carbon atoms, or hydrogen;

$R^8$ and $R^{13}$ is each independently hydrogen, halogen, or alkyl containing 1 to 6 carbon atoms;

$R^{12}$ and $R^{17}$ is each independently halogen, hydrogen, or alkyl containing 1 to 6 carbon atoms; and $R^4$ and $R^5$ are each independently halogen, hydrogen or alkyl containing 1 to 6 carbon atoms.

5. The process as recited in claim 4 wherein $R^9$, $R^{10}$, $R^{11}$, $R^{14}$, $R^{15}$, and $R^{16}$ are each hydrogen.

6. The process as recited in claim 5 wherein $R^8$, $R^{12}$, $R^{13}$, and $R^{17}$ are each alkyl containing 1–6 carbon atoms.

7. The process as recited in claim 5 wherein $R^4$ and $R^5$ are each hydrogen or methyl.

8. The process as recited in claim 4 wherein:

$R^1$, $R^2$ and $R^3$, $R^9$, $R^{10}$, $R^{11}$, $R^{14}$, $R^{15}$ and $R^{16}$ are hydrogen, $R^4$ and $R^5$ are methyl, and $R^8$, $R^{12}$, $R^{13}$ and $R^{17}$ are isopropyl;

$R^1$, $R^2$ and $R^3$, $R^9$, $R^{10}$, $R^{11}$, $R^{14}$, $R^{15}$ and $R^{16}$ are hydrogen, $R^4$ and $R^5$ are methyl, and $R^8$, $R^{12}$, $R^{13}$ and $R^{17}$ are methyl;

$R^1$, $R^2$ and $R^3$, $R^9$, $R^{10}$, $R^{11}$, $R^{12}$, $R^{14}$, $R^{15}$, $R^{16}$ and $R^{17}$ are hydrogen, $R^4$ and $R^5$ are methyl, and $R^8$ and $R^{13}$ are t-butyl; or $R^1$, $R^2$ and $R^3$, $R^9$, $R^{10}$, $R^{11}$, $R^{14}$, $R^{15}$, $R^{16}$, $R^8$, $R^{12}$, $R^{13}$ and $R^{17}$ are hydrogen, and $R^4$ and $R^5$ are methyl.

9. The process as recited in claim 1 wherein X is chloride, bromide or nitrate.

10. The process as recited in claim 4 wherein said neutral Lewis acid is an alkyl aluminum compound.

11. The process as recited in claim 10 wherein said alkyl aluminum compound is polymethylaluminoxane.

12. The process as recited in claim 4 wherein said temperature is about 0° C. to about 100° C.

13. The process as recited in claim 1 wherein $R^{20}$ contains 1 to 4 carbon atoms.

14. A process for the polymerization of propylene, comprising, contacting, at a temperature of about −40° C. to about +300° C., propylene and a compound of the formula

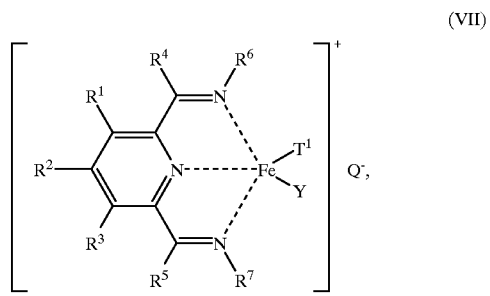

(VII)

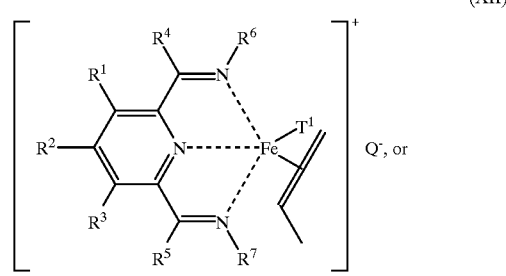

(XII)

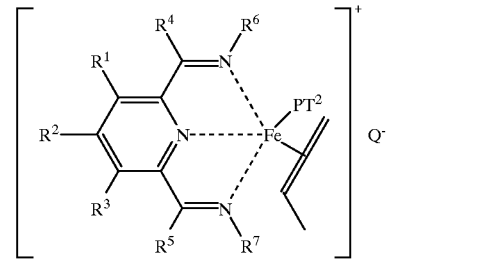

(IX)

wherein:

$R^1$, $R^2$ and $R^3$ are each independently hydrogen, hydrocarbyl, substituted hydrocarbyl, or an inert functional group;

$R^4$ and $R^5$ are each independently hydrogen, hydrocarbyl, an inert functional group or substituted hydrocarbyl;

$R^6$ and $R^7$ are aryl or substituted aryl;

$T^1$ is hydride or alkyl or any other anionic ligand into which propylene can insert;

Y is a neutral ligand capable of being displaced by propylene or a vacant coordination site;

Q is a relatively non-coordinating anion;

P is a divalent polyolefin group; and $T^2$ is an end group.

15. The process as recited in claim 14 wherein said compound is (VII).

16. The process as recited in claim 14 wherein said compound is (IX).

17. The process as recited in claim 14 wherein said compound is (XII).

18. The process as recited in claim 14 wherein: $R^6$ is

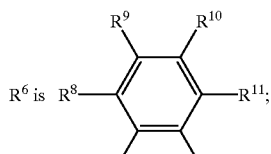

$R^7$ is

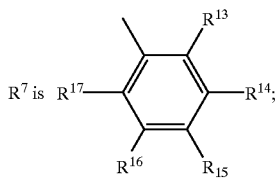

$R^8$ and $R^{13}$ are each independently hydrocarbyl, substituted hydrocarbyl or an inert functional group;
$R^9$, $R^{10}$, $R^{11}$, $R^{14}$, $R^{15}$ and $R^{16}$ are each independently hydrogen, hydrocarbyl, substituted hydrocarbyl or an inert functional group;
$R^{12}$ and $R^{17}$ are each independently hydrogen, hydrocarbyl, substituted hydrocarbyl or an inert functional group;
and provided that any two of $R^8$, $R^9$, $R^{10}$, $R^{11}$, $R^{12}$, $R^{13}$, $R^{14}$, $R^{15}$, $R^{16}$ and $R^{17}$ that are vicinal to one another, taken together may form a ring.

19. The process as recited in claim 18 wherein:
$R^1$, $R^2$ and $R^3$ are hydrogen;
$R^9$, $R^{10}$, $R^{11}$, $R^{14}$, $R^{15}$ and $R^{16}$ is each independently halogen, alkyl containing 1 to 6 carbon atoms, or hydrogen;
$R^8$ and $R^{13}$ is each independently hydrogen, halogen, or alkyl containing 1 to 6 carbon atoms;
$R^{12}$ and $R^{17}$ is each independently halogen, hydrogen, or alkyl containing 1 to 6 carbon atoms; and
$R^4$ and $R^5$ are each independently halogen, hydrogen or alkyl containing 1 to 6 carbon atoms.

20. The process as recited in claim 19 wherein $R^9$, $R^{10}$, $R^{11}$, $R^{14}$, $R^{15}$, and $R^{16}$ are each hydrogen.

21. The process as recited in claim 20 wherein $R^8$, $R^{12}$, $R^{13}$, and $R^{17}$ are each alkyl containing 1–6 carbon atoms.

22. The process as recited in claim 20 wherein $R^4$ and $R^5$ are each hydrogen or methyl.

23. The process as recited in claim 17 wherein:
$R^1$, $R^2$ and $R^3$, $R^9$, $R^{10}$, $R^{11}$, $R^{14}$, $R^{15}$ and $R^{16}$ are hydrogen, $R^4$ and $R^5$ are methyl, and $R^8$, $R^{12}$, $R^{13}$ and $R^{17}$ are isopropyl;
$R^1$, $R^2$ and $R^3$, $R^9$, $R^{10}$, $R^{11}$, $R^{14}$ $R^{15}$ and $R^{16}$ are hydrogen, $R^4$ and $R^5$ are methyl, and $R^8$, $R^{12}$, $R^{13}$ and $R^{17}$ are methyl;
$R^1$, $R^2$ and $R^3$, $R^9$, $R^{10}$, $R^{11}$, $R^{12}$, $R^{14}$, $R^{15}$, $R^{16}$ and $R^{17}$ are hydrogen, $R^4$ and $R^5$ are methyl, and $R^8$, and $R^{13}$ are t-butyl; or
$R^1$, $R^2$ and $R^3$, $R^9$, $R^{10}$, $R^{11}$, $R^{14}$, $R^{15}$, $R^{16}$, $R^8$, $R^{12}$, $R^{13}$ and $R^{17}$ are hydrogen, and $R^4$ and $R^5$ are methyl.

24. The process as recited in claim 14, 15, 16 or 17 wherein said temperature is about 0° C. to about 100° C.

25. The process as recited in claim 1 wherein said compound is or becomes part of a heterogeneous catalyst on a solid support.

26. The process as recited in claim 25 carried out in the gas phase or liquid phase.

27. The process as recited in claim 2 wherein said complex is or becomes part of a heterogeneous catalyst on a solid support.

28. The process as recited in claim 27 carried out in the gas or liquid phase.

29. The process as recited in claim 14 wherein (VII), (IX) or (XII) is part of a heterogeneous catalyst on a solid support.

30. The process as recited in claim 29 carried out in the gas or liquid phase.

31. The process as recited in claim 25, 27 or 29 wherein said solid support is silica or alumina.

32. The process as recited in claim 1 or 2 in which a major portion of a product of said process is one or more alpha olefins.

* * * * *